US012260762B2

(12) United States Patent
Nugent et al.

(10) Patent No.: US 12,260,762 B2
(45) Date of Patent: Mar. 25, 2025

(54) APPLICATION SOFTWARE FOR OVERHEAD OBSTACLE DETECTION AND AVOIDANCE SYSTEM FOR VEHICLES

(71) Applicant: Francis C. Nugent, Irvington, NY (US)

(72) Inventors: Francis C Nugent, Irvington, NY (US); Brian Nugent, Irvington, NY (US)

( * ) Notice: Subject to any disclaimer, the term of this patent is extended or adjusted under 35 U.S.C. 154(b) by 0 days.

(21) Appl. No.: 18/798,785

(22) Filed: Aug. 8, 2024

(65) Prior Publication Data

US 2024/0404409 A1 Dec. 5, 2024

Related U.S. Application Data

(63) Continuation-in-part of application No. 18/533,155, filed on Dec. 7, 2023.

(60) Provisional application No. 63/431,086, filed on Dec. 8, 2022.

(51) Int. Cl.
*G08G 1/16* (2006.01)

(52) U.S. Cl.
CPC ............. *G08G 1/165* (2013.01); *G08G 1/161* (2013.01)

(58) Field of Classification Search
None
See application file for complete search history.

(56) References Cited

U.S. PATENT DOCUMENTS 4,284,971 A * 8/1981 Lowry ............. G08G 1/096741 340/904
5,474,016 A * 12/1995 Haney ..................... E01F 13/00 116/28 R
9,424,749 B1 * 8/2016 Reed ....................... G08G 1/166
2009/0326760 A1* 12/2009 Clark ................. G08G 1/09675 454/75
2010/0057353 A1* 3/2010 Friedman ......... G08G 1/096838 342/357.31
2010/0286897 A1* 11/2010 Dedic ...................... G08G 1/08 701/117
2023/0245560 A1* 8/2023 Cheng .................. G08G 1/0112 340/905

FOREIGN PATENT DOCUMENTS

GB 2405541 A * 3/2005 ............. G01S 13/88

* cited by examiner

*Primary Examiner* — Muhammad Adnan
(74) *Attorney, Agent, or Firm* — Alexander Postnikov

(57) ABSTRACT

A device may determine a geographical location and direction of a vehicle traveling on a highway, street or road, the vehicle having a known height. A device may determine the presence of a nearby overhead hazard toward which the vehicle is traveling. A device may retrieve from a database a height of the nearby overhead hazard. A device may compare height of the nearby overhead hazard to the known height of the vehicle. A device may provide an audible warning to the driver that the overhead hazard is too low for the vehicle to safely pass.

20 Claims, 13 Drawing Sheets

APPLICATION SOFTWARE FOR OVERHEAD OBSTACLE DETECTION AND AVOIDANCE SYSTEM FOR VEHICLES

CROSS-REFERENCE TO RELATED APPLICATIONS

This application is a Continuation-in-part of, and claims the benefit of, U.S. non-provisional patent application Ser. No. 18/533,155, filed on Dec. 7, 2023, which claims the benefit of U.S. provisional patent application No. 63/431,086, filed on Dec. 8, 2022, the contents of which are incorporated by reference in their entirety.

BACKGROUND

Field of the Invention

The present invention relates broadly to driver safety and more specifically to warning drivers of overhead obstacles that pose a risk of collision.

Large trucks, tractor-trailer units, recreational vehicles, buses, tall work vans, and ambulances are commonplace in modern society and are used daily for transporting a multitude of items from one place to another. The highway system in the United States, as well as in most other countries, includes numerous bridges and overpasses that may create difficulties for the operators of large vehicles because the height of some vehicles exceeds the clearance required to safely travel under such obstacles. If a truck, tractor-trailer unit, or other vehicle exceeds the required clearance of a bridge or overpass, and the operator of the vehicle is not able to make that determination prior to encountering the obstacle, a collision can and often does occur. These collisions typically result in extensive damage to both the vehicle and the section of the roadway involved. The operator of the vehicle, the operators of other vehicles on the affected section of road, and even pedestrians crossing a bridge or overpass may also be seriously injured or killed.

Despite the problems described above, few systems for allowing vehicles such as trucks, tractor-trailer units, or other large and/or tall vehicles to avoid collision with overhead obstacles are commercially available. Many previously developed systems are either prohibitively expensive to install, prohibitively difficult to use, or are only somewhat effective for their intended purpose. Thus, there is an ongoing need for a reliable, relatively inexpensive and easy to install detection system for allowing large (i.e., tall) vehicles to avoid costly and dangerous collisions with overhead obstacles such as bridges and overpasses.

SUMMARY OF THE INVENTION

In one aspect, the present invention provides a method for warning a driver of a vehicle of an overhead hazard, by determining a geographical location and direction of a vehicle traveling on a highway, street or road, the vehicle having a known height; determining the presence of a nearby overhead hazard toward which the vehicle is traveling; retrieving from a database a height of the nearby overhead hazard; comparing height of the nearby overhead hazard to the known height of the vehicle; and providing an audible warning to the driver that the overhead hazard is too low for the vehicle to safely pass.

In another aspect, the present invention provides a computer readable medium containing instructions which, when executed by a computer, warn a driver of a vehicle of an overhead hazard, by: determining a geographical location and direction of a vehicle traveling on a highway, street or road, the vehicle having a known height; determining the presence of a nearby overhead hazard toward which the vehicle is traveling; retrieving from a database a height of the nearby overhead hazard; comparing height of the nearby overhead hazard to the known height of the vehicle; and providing an audible warning to the driver that the overhead hazard is too low for the vehicle to safely pass.

BRIEF DESCRIPTION OF THE DRAWINGS

The accompanying drawings, which are incorporated into and form a part of the specification, schematically illustrate one or more example embodiments of the invention and, together with the general description given above and detailed description given below, serve to explain the principles of the invention, and wherein.

DETAILED DESCRIPTION

Figure 1:
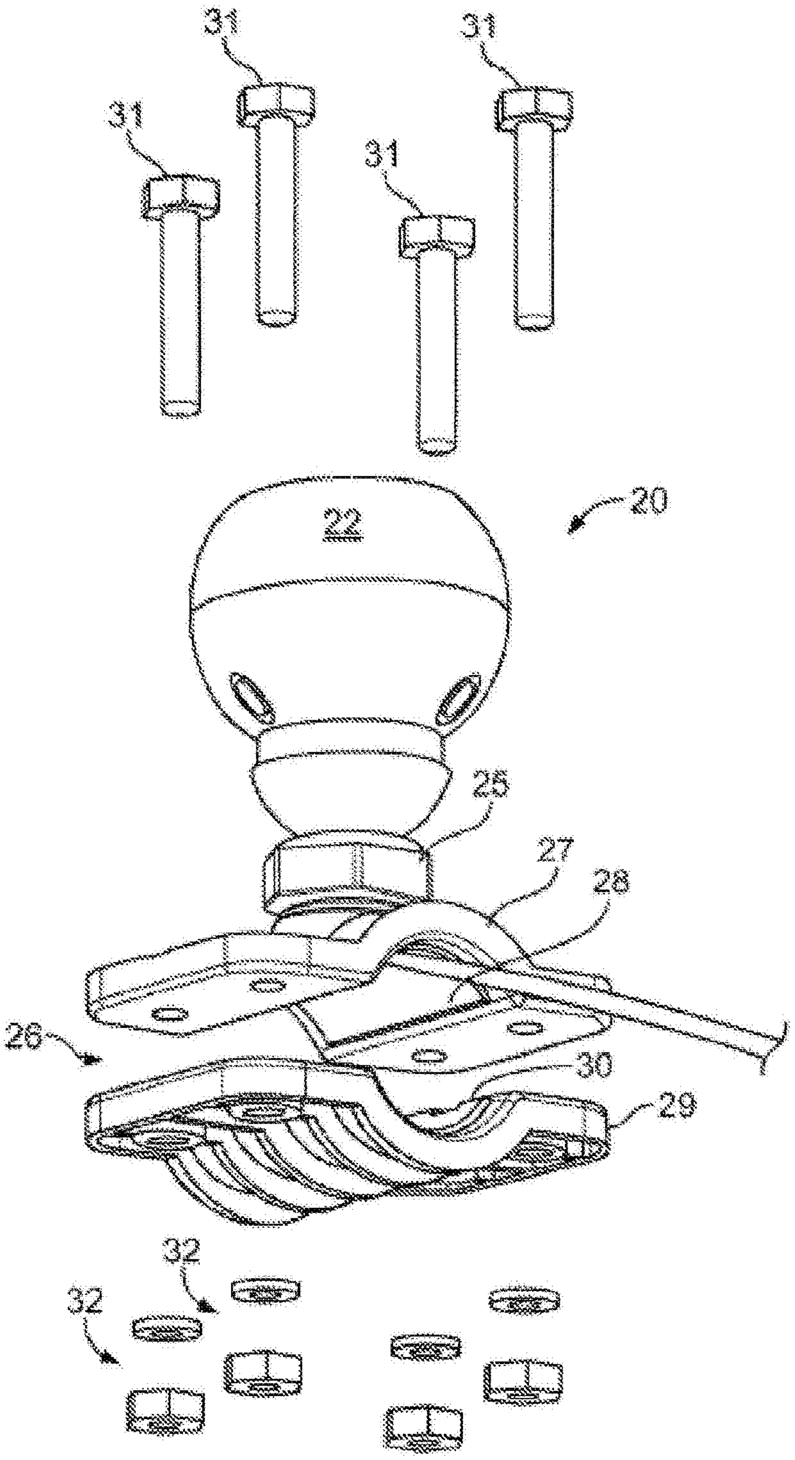
FIG. 1 is a semi-exploded view depicting a prior art sensor assembly component of an example implementation of the disclosed obstacle detection and avoidance system.

The described invention relates in general to an obstacle detection and avoidance system for use with vehicles, and more specifically to an overhead obstacle detection and avoidance system that includes one or more sensors in communication with a processing and control unit for determining the height of an overhead obstacle, comparing that height to the maximum height of a vehicle, warning a vehicle operator about potential hazards, and taking any necessary actions to avoid a collision.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed inventive subject matter. Accordingly, the following implementations are set forth without any loss of generality to, and without imposing limitations upon, the claimed subject matter.

Disclosed implementations relate generally to systems, devices, and methods for use with large and/or tall vehicles such as trucks, tractor-trailer units, recreational vehicles, buses, tall work vans, and ambulances for detecting and avoiding stationary objects such as a bridges or overpasses located above a roadway. The disclosed obstacle detection and avoidance system is essentially a two-part system that includes a sensor component that communicates with a processing and control component. The sensor component is typically mounted on the side mirror frame of a truck, tractor-trailer unit, or other vehicle of significant size and height, although other placements are possible, such as on the hood of the vehicle near the windshield or the headlights. The control component is in electrical communication with the sensor component and can be programmed with the height of the sensor component and the height of the trailer that is being pulled or the truck that is being driven using either application software resident on a smartphone or tablet computing device or the original equipment manufacturer (OEM) in-cab touch screen display. In use, when the vehicle approaches a potential obstacle or hazard, the operator of the vehicle slowly pulls the front portion (i.e., cab) of the vehicle under the hazard. The height of the obstacle relative to the height of the trailer is determined and reported to the vehicle's operator. If the obstacle is lower than an acceptable height, and alarm sounds and the operator may avoid moving any farther forward. In this manner, the vehicle's operator may avoid serious damage to the vehicle and/or the obstacle. If the entrance is high enough for the vehicle to enter, the system continues to measure the overhead hazard or obstacle until the vehicle is clear of the hazard. This system addresses the problem of hazards, such as bridges, trestles, trees, parking garages, awnings, etc. that are unmarked or mismarked, or areas where new asphalt has been added (up to several inches) to the roadbed and the height signs (i.e. 12", 12' 6") have not been changed accordingly. These hazards are dangerous not only for trucks but also ambulances and tall vans. In some implementations, the disclosed system includes collision mitigation or avoidance aspects that include automatic responses to hazards (e.g., automatic brake engagement by the vehicle control system upon receiving information from the processor regarding a particular hazard). Variants of the disclosed obstacle detection and avoidance system are described in U.S. Pat. Nos. 8,212,660 and 8,207,836, both of which are incorporated-by-reference herein, in their entirety, for all purposes.

Figure 2:
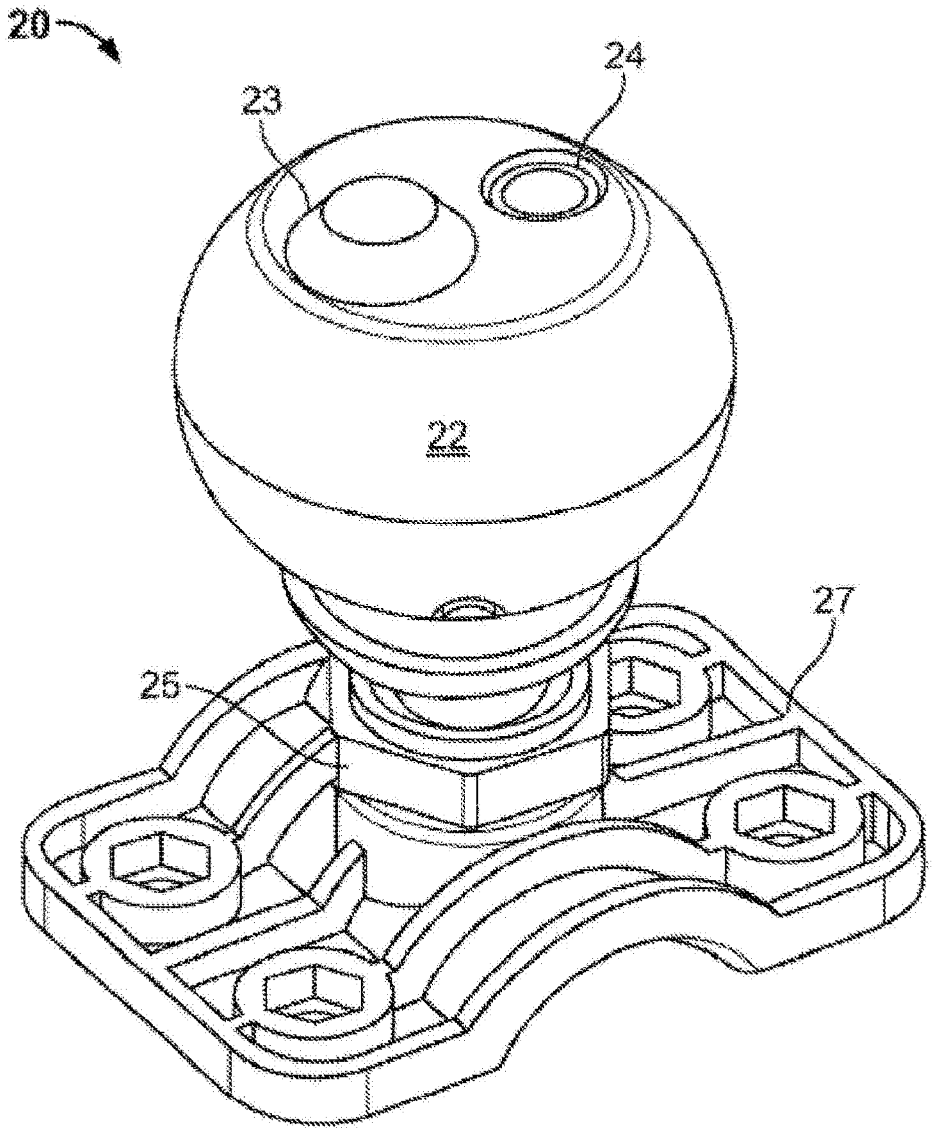
FIG. 2 is a top perspective view of the sensor assembly component of FIG. 1.
Figure 3:
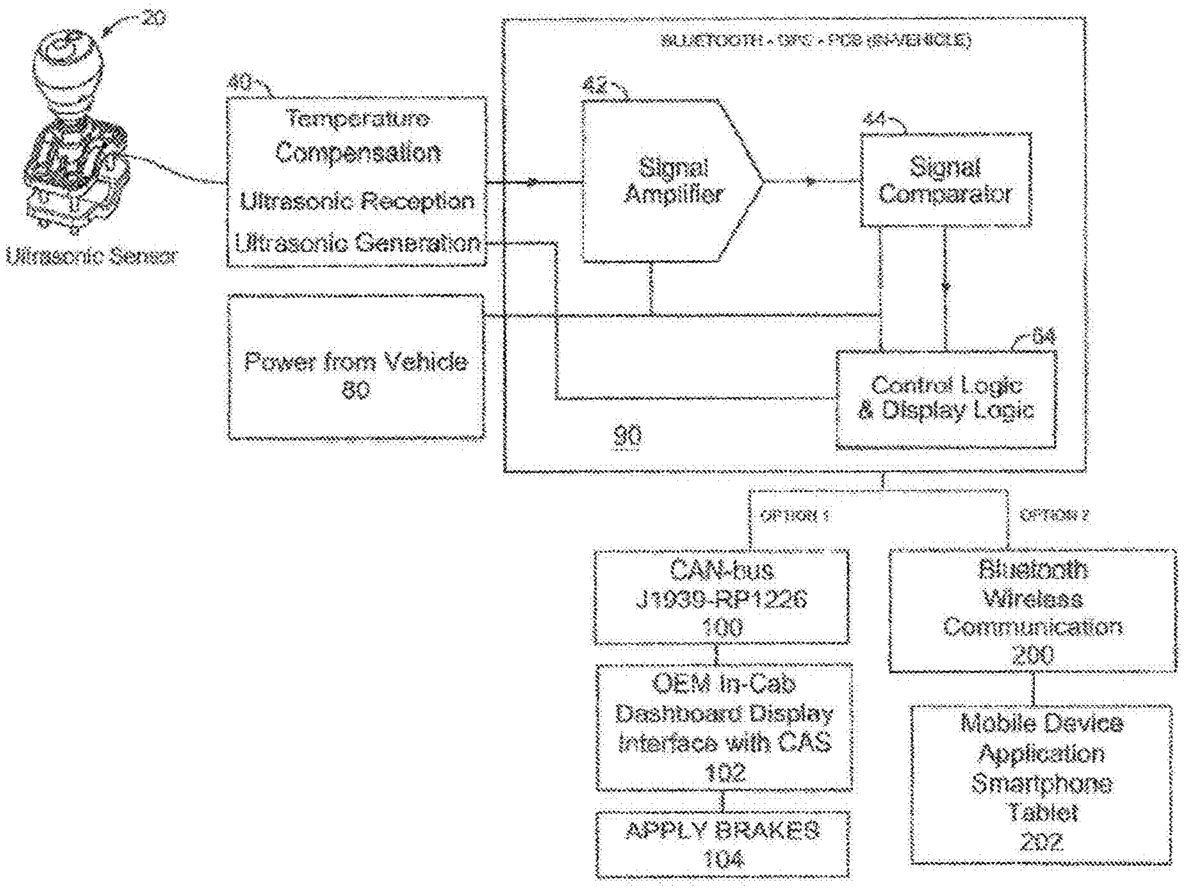
FIG. 3 is a simplified schematic depicting an prior art example implementation of the disclosed obstacle avoidance and detection system detailing various components and certain functional aspects of the system.
Figure 4:
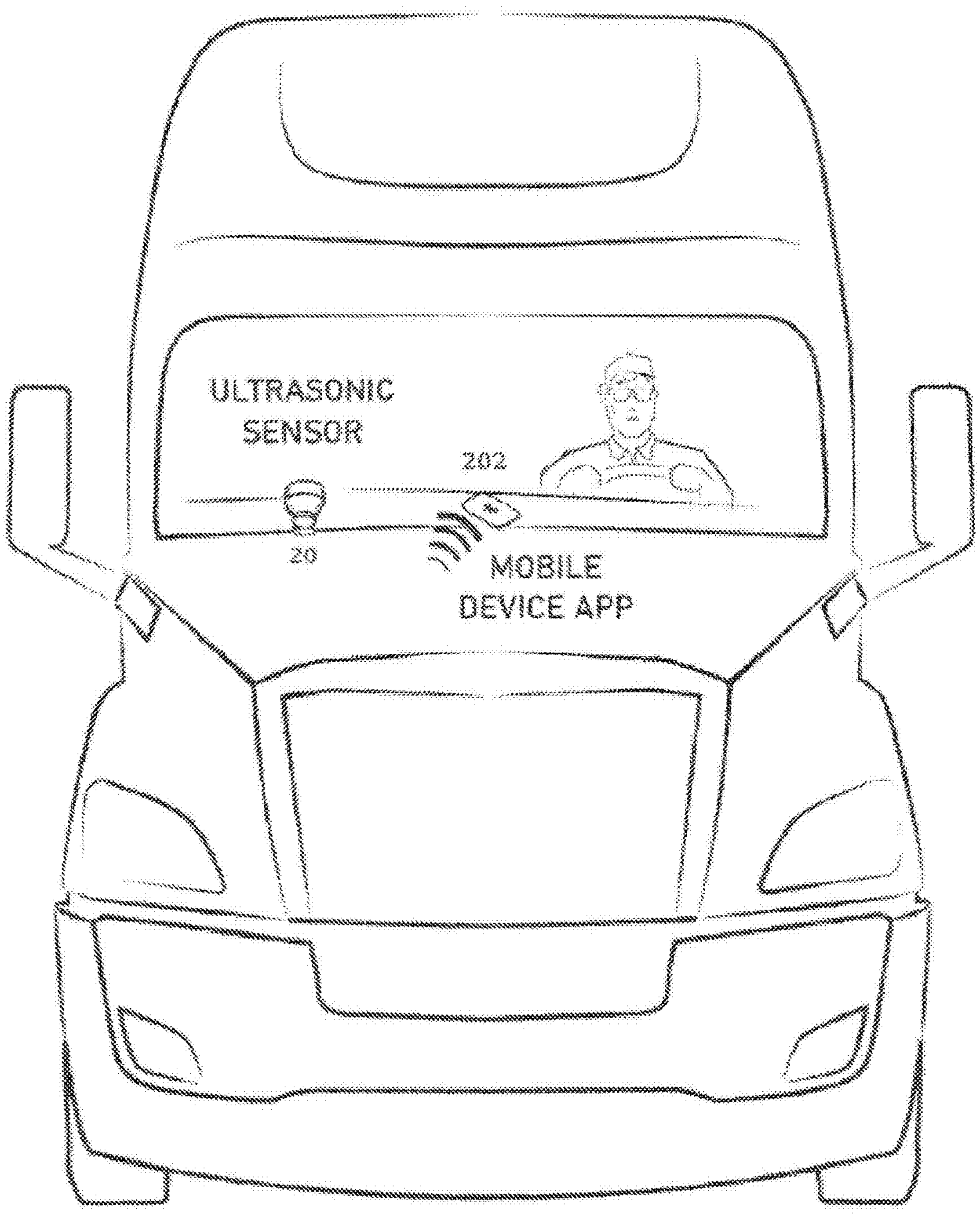
FIG. 4 depicts the sensory assembly component a prior art obstacle detection and avoidance system mounted outside a vehicle and communicating with the processing component of the system which is underneath the hood of the vehicle (not shown), wherein the processing component is wirelessly communicating information to the operator of the vehicle using application software resident on a mobile device.
Figure 5:
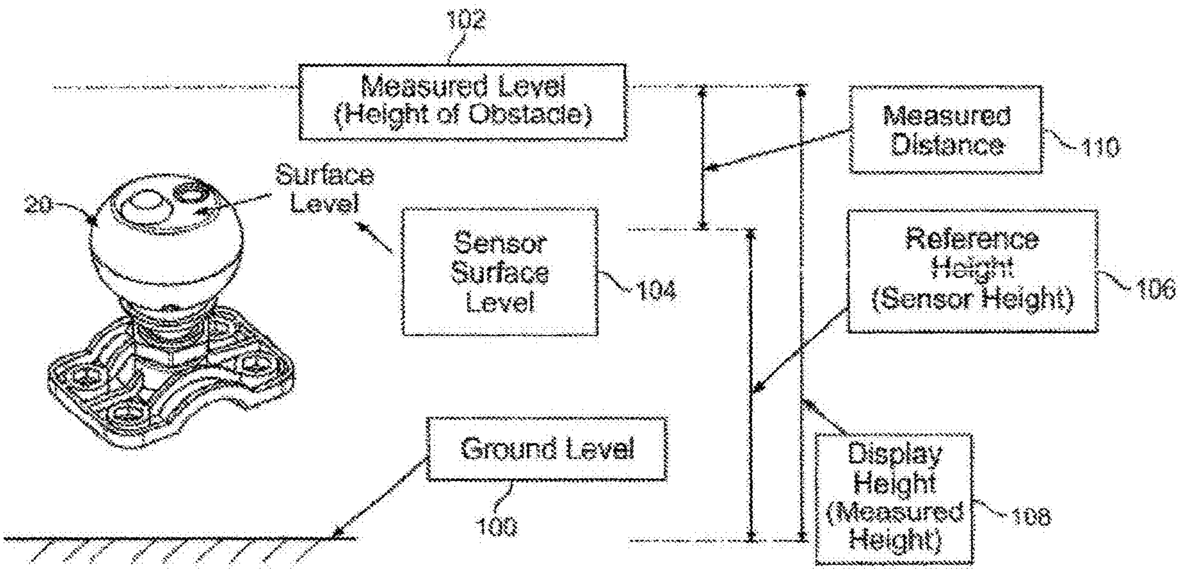
FIG. 5 is a block diagram illustrating the various heights measured and calculated by an example implementation of the disclosed obstacle detection and avoidance system.
Figure 6:
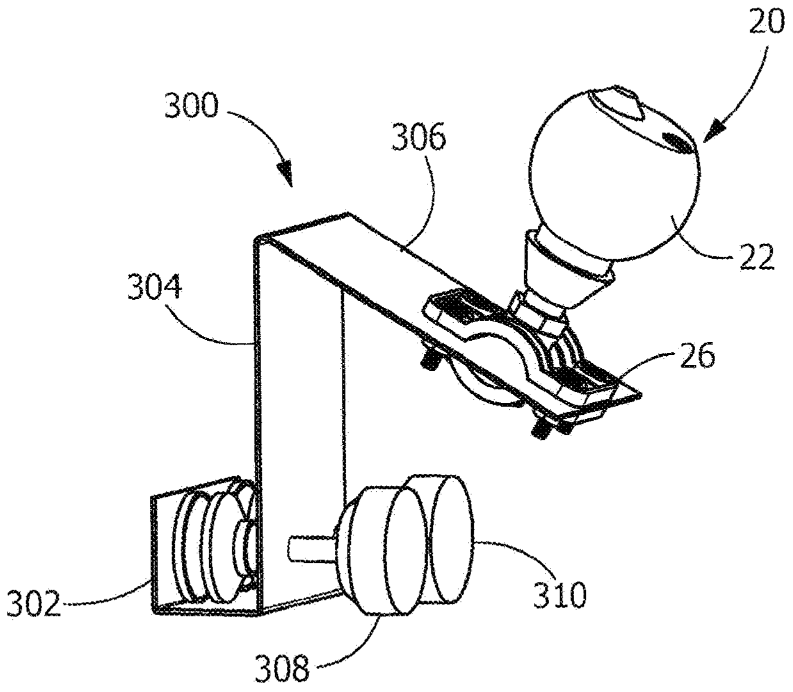
FIG. 6 depicts the sensor assembly component of the disclosed obstacle detection and avoidance system mounted on a first example implementation of a positioning clamp.
Figure 7:
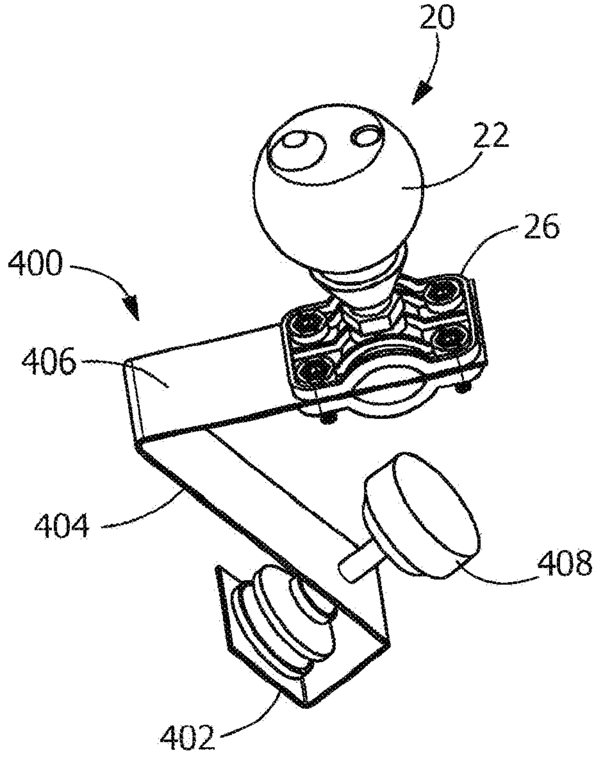
FIG. 7 depicts the sensor assembly component of the disclosed obstacle detection and avoidance system mounted on a second example implementation of a positioning clamp.

FIG. 1 provides a semi-exploded view of the sensor assembly component of an example implementation of the disclosed obstacle detection and avoidance system; and FIG. 2 is a top perspective view of the sensor assembly component of FIG. 1. FIG. 3 provides a simplified schematic depicting an example implementation of the disclosed obstacle avoidance and detection system detailing various components and certain functional aspects of the system and FIG. 4 depicts the sensory assembly component of the disclosed obstacle detection and avoidance system mounted outside a vehicle and communicating with the processing component of the system which is underneath the hood of the vehicle (not shown), wherein the processing component is wirelessly communicating information to the operator of the vehicle using application software resident on a mobile device. FIG. 5 provides a block diagram illustrating the various heights measured and calculated by an example implementation of the disclosed obstacle detection and avoidance system and FIG. 6 depicts the sensor assembly component of the disclosed obstacle detection and avoidance system mounted on a first example implementation of a positioning clamp; and FIG. 7 depicts the sensor assembly component of the disclosed obstacle detection and avoidance system mounted on a second example implementation of a positioning clamp.

As shown in FIGS. 1-2, an example implementation of the disclosed obstacle detection and avoidance system includes sensor assembly 20 which is in electrical communication with processor 90 using wired connectivity. Sensor assembly 20 further includes sensor body 22, which houses sensor 23 and level 24. Holding nut 25 connects sensor body 22 to sensor base 26, which includes top clamping portion 27 and bottom clamping portion 29. Top gasket 28 and bottom gasket 30 are included in sensor base 26 for purposes of stabilizing sensor assembly 20 when it is mounted on the exterior of a vehicle. Bolts 31 and washers and nuts 32 are used to attach sensor base 26 to a substrate. In some implementations, sensor 23 is an ultrasonic sensor (preferably an ultrasonic transducer) that provides ultrasonic generation and ultrasonic reception, and that may include temperature compensation module 40.

Ultrasonic sensors are known as transducers when they both send and receive signals and work on a principle similar to radar or sonar, which evaluates attributes of a target by interpreting the echoes from radio or sound waves respectively. Ultrasonic sensors generate high frequency sound waves and evaluate the echo which is received back by the sensor. Sensors calculate the time interval between sending the signal and receiving the echo to determine the distance to an object. Systems typically use a transducer which generates sound waves in the ultrasonic range, above 20,000 hertz, by turning electrical energy into sound, then upon receiving the echo turn the sound waves into electrical energy which can be measured and displayed. Ultrasonic transducers send and receive sound waves for many types of sensing. Examples include distance, proximity, level, nondestructive evaluation, web break detection, counting, and security applications. They typically operate at their resonant frequency with various construction options, beam patterns, and power levels.

Ultrasonic transducers are available in various types for different applications and many such transducers are compatible with the present invention. For example, plain general-purpose transducers, including air transducers, are available with no specialized features. More specialized styles are common as well, such as contact transducers for placement directly on the surface to be measured. Dual element transducers have two elements in the transducer housing and allow the transmitter and receiver to operate independently. The elements are angled toward each other to create a reflective transmit/receive pathway. Angle beam transducers include mounted transparent angle blocks and are often used for weld inspection and flaw detection. They typically utilize refracted shear waves to detect flaws throughout the depth of welded areas. Submersible transducers are designed to be totally submerged in a liquid medium, most often fresh water. A protected element style protects the transducer element for use on rough surfaces. Delay line transducers are versatile, often with replaceable head options such as membranes and wear caps. Such transducers are used to gage or detect flaws such as delamination in thin materials. Shear wave transducers introduce shear waves into material without using an angle beam wedge. The ratio of shear wave components to longitudinal components can exceed 30 dB. Medical style transducers and housings are designed for specific medical applications and are also widely commercially available.

Common features available for ultrasonic transducers include (i) array configurations for connecting multiple transducers in series or parallel; (ii) temperature compensation circuitry that compensates for sensitivities changing with ambient temperature; and (iii) optional analog output. Most transducers output analog voltage, but may have provisions for current loop output, etc. Ultrasonic transducers that are potentially compatible with the present invention may be obtained from a variety of commercial sources such as Maxbotics (EZ0-4), Robotic Electronics/Devantech (SRF10, SRF08, SRF04, and SR235), Idec (SAGA), ASL/Seiz & Viscarret (Usonic), and Sonaswitch (MiniA and MiniS). A variety of other ultrasonic devices are potentially compatible with the disclosed obstacle detection and avoidance system.

As best shown in FIG. 3, processor 90 is mounted within the vehicle, typically under the vehicle's hood, and includes Bluetooth and/or other wireless communications capabilities and global positioning system (GPS) capabilities. Processor 90 may be or may include a printed circuit board (PCB) that includes signal amplifier 24, signal comparator 44, and control and display logic 64 functionality, in addition to other desired functionality. Power is supplied to processor 90 by vehicle power 80. In the implementation shown in FIG. 3, processor 90 produces two separate, but not mutually exclusive, output options.

In the first option, processor 90 utilizes a controller area network system (CAN bus) and the J1939-RP1226 protocol (i.e., Society of Automotive Engineers standard SAE J1939) at 100 to communicate with the original equipment manufacturer (OEM) in-cab dashboard display and, in some implementations, interface with collision avoidance systems (CAS) at 102 to apply the vehicle's brakes at 104 if an overhead obstacle is too low for safe clearance. Examples of collision avoidance systems that are potentially compatible with the disclosed obstacle detection and avoidance system include Wingman Fusion (Bendix); Detroit Assurance (Daimler); and On Guard (Wabco), all of which are forward collision mitigation systems (e.g., detecting and avoiding collisions with vehicles that are in front of the vehicle possessing the sensor).

In the second option, processor 90 utilizes Bluetooth wireless communication or other wireless communication at 200 to communicate with a smartphone or other mobile device on which application software specific to the disclosed obstacle detection and avoidance system has been loaded and is operating. This application software may be referred to as tracking app 830 (FIG. 9) and is used to warn the driver of a vehicle if an obstacle is too low for safe clearance. The GPS capability included in processor 90 may be used to mark the location and height of an overhead obstacle and then download such information into database 812. That stored information on the database is used by App 831 (FIG. 10) where it provide drivers with an audible alarm and accurate height reference (FIG. 11) before they reach the pre-measured overhead obstacle, GPS located to prevent a vehicular collision, thus warning the driver of the danger of a collision and instructing the driver to take a different route. With reference to FIG. 5, the disclosed obstacle detection and avoidance system may be used according to the following example method. Using sensor base 26, sensor assembly 20 is mounted on the exterior of a vehicle in a location that allows sensor 23 to have a clear and unobstructed view (i.e., no impediments or blockages 45° from vertical). No portion of the vehicle on which sensor assembly 20 is mounted should block the signal path of sensor 23. Sensor assembly 20 is then connected to processor 90 which is wirelessly connected to either the vehicle's OEM in-cab dashboard display or a smartphone, tablet, or other mobile device. The height above ground level 100 at which sensor 23 (sensor surface level 104) is mounted is measured (e.g., manually) to determine reference height 106. Reference height 106 is then manually entered into processor 90. The tallest portion above ground level 100 of the vehicle in which the obstacle detection and avoidance system is installed is measured (e.g., manually or reference to printed height on vehicle or owner's manual) and entered into processor 90. As the vehicle slowly moves under an overhead item (i.e., a potential obstacle), sensor 23 is used to measure the overhead distance between the bottom of the overhead obstacle and the sensor itself. This distance is referred to as measured distance 110, which is then stored in processor 90. Processor 90 is then used to calculate a measured height 108 of the obstacle, which is displayed on the vehicle's OEM in-cab dashboard display or a smartphone, tablet, or other mobile device. Measured height 108 is reference height 106 added to measured distance 110. A visual and/or audible alarm is produced if the measured height 108 of the overhead obstacle is less than the height of the tallest portion (e.g., the trailer or portion of the vehicle behind the cab) of the vehicle above ground level 100.

In this manner, the operator of a vehicle in which the disclosed obstacle detection and avoidance system has been installed may avoid a collision with an overhead obstacle that is lower than the maximum height of the vehicle. In an example implementation, the obstacle detection and avoidance system remains active while the cab portion of the vehicle passes completely under the overhead item and automatically shuts off when the potential obstacle has been cleared. The disclosed obstacle avoidance and detection system is typically always on. Once the operator has activated the system, the system will remain on until the operator turns the system off. The system will not display measured heights until the system detects a solid obstacle that needs to be measured. Once the obstacle has been cleared, the system will continue displaying the last measurement for 90 seconds and then stop displaying a number on the in-cab display or mobile device. The obstacle and display system then remains on until the next needed measurement. In another example implementation, an audio alarm output produces an alarm and a light flashes if the height read by sensor 23 is lower than reference height 106. For example, if the height programmed into the unit is 13'0" and the actual height of the obstacle is displayed as 13'1", LED 62 will show a constant 13'1". If LED 62 reads 13'0" or below, LED 62 locks onto displaying that number, and the audible alarm is activated to warn the driver.

In one implementation, when the disclosed obstacle detection and avoidance system detects an overhead obstacle, the height of which is lower than the height of the tallest portion above ground level 100 of the vehicle in which the obstacle detection and avoidance system is installed, the visual and audible alarms sound and the system locks into the lower height. Upon locking into the lower height, the sensor stops taking measurements until the obstacle has been cleared and the unit has been manually reset by the user. Preventing the obstacle avoidance system from automatically resetting and beginning to take new overhead distance measurements provides a driver or operator with more time to become aware of a potentially dangerous overhead obstacle and respond accordingly. In this and other embodiments, the volume of the audible warning can be set to a level that allows it to be easily heard over the engine sound generated by the vehicle when being driven.

FIG. 6 depicts the sensor assembly component of the disclosed obstacle detection and avoidance system mounted on a first example implementation of a positioning clamp; and FIG. 7 depicts the sensor assembly component of the disclosed obstacle detection and avoidance system mounted on a second example implementation of a positioning clamp. As shown in FIG. 6, sensor 20 is mounted on positioning clamp 300 using sensor base 26. Clamp 300 includes contoured base portion 302, vertical riser portion 304, downwardly-angled top portion 306, first tightening device 308, and second tightening device 310, both which cooperate with the geometry of base portion 302 to attach the entire sensor assembly to a substrate at an angle most conducive to proper positioning of sensor 20. As shown in FIG. 7, sensor 20 is mounted on positioning clamp 400 using sensor base 26. Clamp 400 includes contoured base portion 402, vertical riser portion 404, downwardly-angled top portion 406, and tightening device 408, which cooperates with the geometry of base portion 402 to attach the entire sensor assembly to a substrate at an angle most conducive to proper positioning of sensor 20. Clamps 300 and 400 permit sensor 20 to be mounted on different types of vehicles.

Various embodiments provide methods for using the described system for preventing the collision of a vehicle with an overhead obstacle. An example method includes mounting at least one sensor on a vehicle, wherein the vehicle includes a vehicle control system, wherein the at least one sensor is in electrical communication with at least one processor, and wherein the at least one processor is accessible by an operator of the vehicle; determining a reference height, wherein the reference height is the height above ground level at which the at least one sensor is mounted on the vehicle; inputting the reference height into the at least one processor; determining the height of the tallest portion of the vehicle above ground level; inputting the height of the tallest portion of the vehicle above ground level into the at least one processor; using the at least one sensor to measure the overhead distance between the lowest portion of an obstacle and the at least one sensor; using the at least one processor to determine a measured height of the overhead obstacle, wherein the measured height of the overhead obstacle is the reference height added to the distance between the overhead obstacle and the at least one sensor; communicating an alarm message to the operator of the vehicle if the measured height of the overhead obstacle is less than the height of the tallest portion of the vehicle above ground level; and communicating an alarm message to the operator of the vehicle and/or to the vehicle control system if the measured height of the overhead obstacle is less than the height of the tallest portion of the vehicle above ground level.

In an alternate implementation not shown in the Figures, the sensor used is a radar-based sensor. An example of this type of obstacle detection and avoidance system includes a sensor assembly, which is in electrical communication with a processor, which further includes LED display or other type of display, including wireless communication devices. The processor is in electrical communication with a vehicle controller and is powered through the vehicle's internal power distribution system. With regard to providing power to the obstacle detection and avoidance system, in other implementations power is supplied through a diagnostics connector, cigarette lighter connector, or other port or connector that is in electrical communication a source of electrical power within the vehicle. The source of electrical power may be integrated into the vehicle's electronics or may be external thereto (e.g., a separate external battery). The processor is in electrical communication with the vehicle controller though an optional controller area network (CAN) connection. A radar transceiver and antenna are in communication with radar reception and radar generation. Power is provided through power control, which draws power from the vehicle itself. Signal processing and signal discrimination are both provided. The signal is processed using control logic, display logic, and communications logic. Regarding the processed signal, in an Option 1, through a first communications link, signal output is displayed on a visual display and audio output in the form of an alarm occurs. Regarding the processed signal, in an Option 2, through a second communications link, signal output is direct to the vehicle controller such that the vehicle automatically stops or takes some other action intended to avoid a collision. In some versions, radar-based sensors communicate with the processor using the J1939 protocol (i.e., Society of Automotive Engineers standard SAE J1939), for automatic application of the brakes on a vehicle when an overhead obstacle is detected. Certain versions of the disclosed system and method provide connectivity across a fleet or group of vehicles. Accordingly, if a driver determines the height of a particular obstacle, relevant data may be wirelessly sent to and saved on a network server that is accessible by other drivers who may encounter the same obstacle at a later time.

Figure 8:
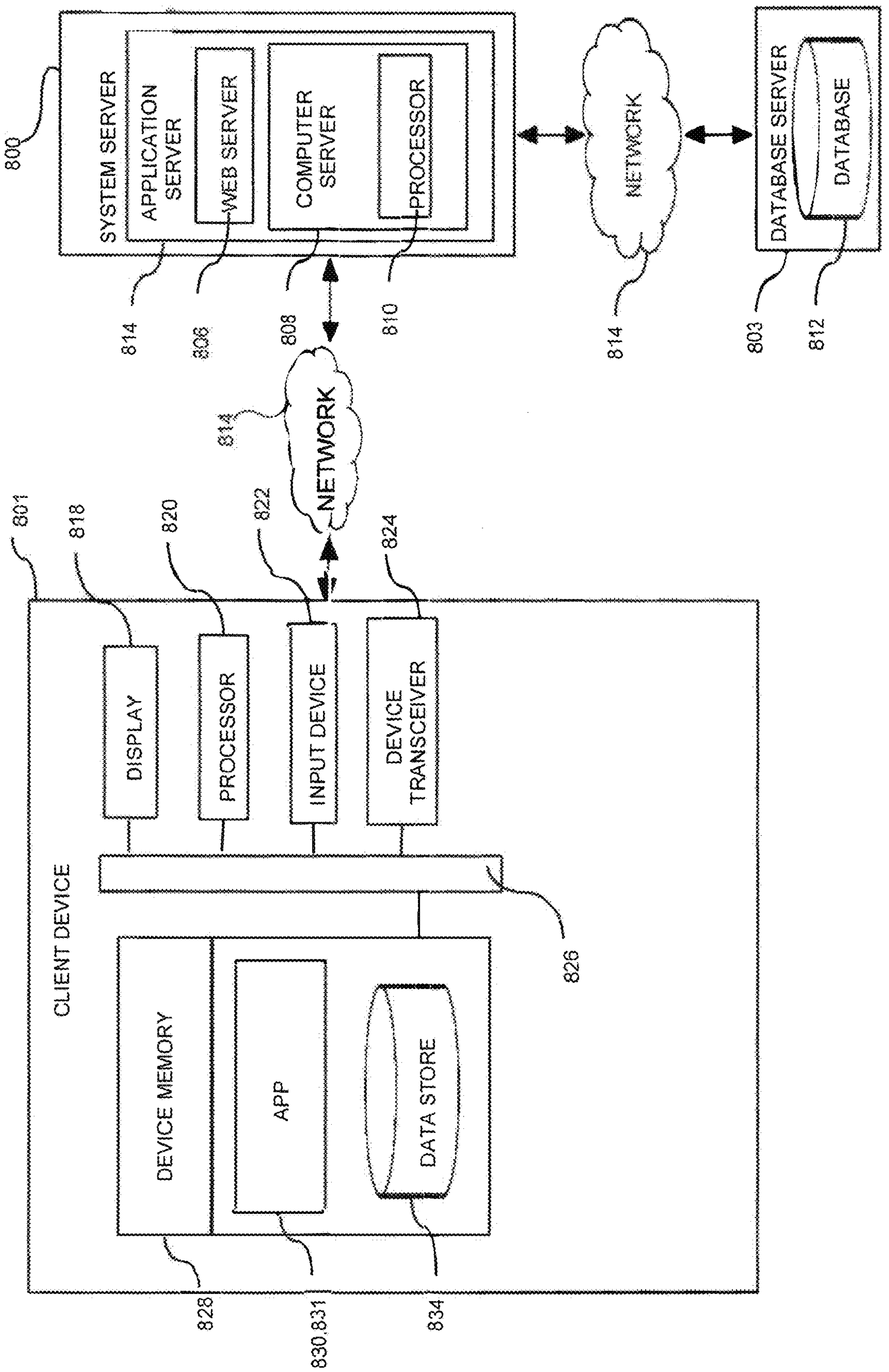
FIGS. 8-9 depict computer network architectures used in accordance with the app of the present invention.
Figure 9:
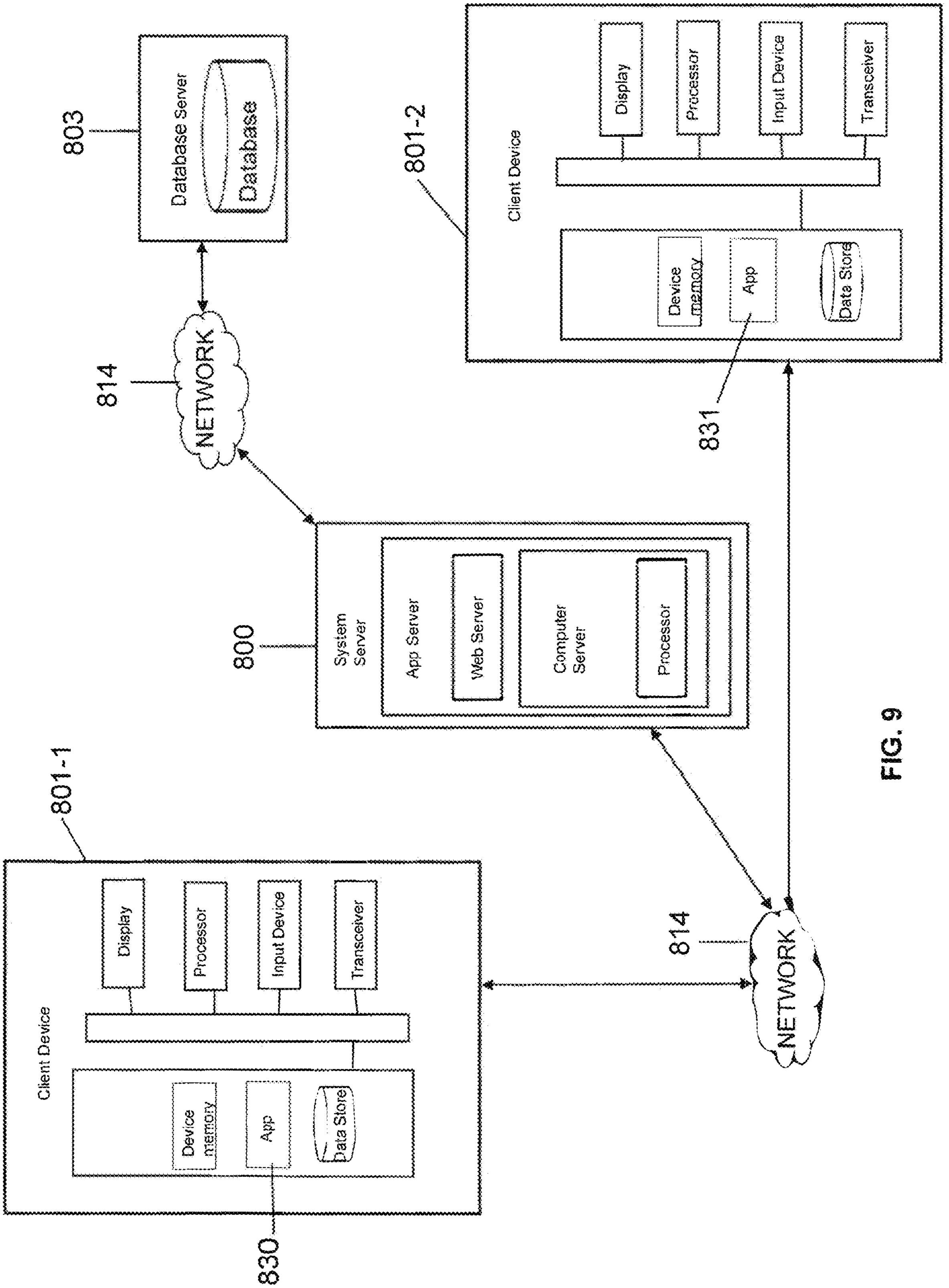

FIGS. 8-9 illustrate the general architecture of a client-server system 800 that operates in accordance with embodiments of the present invention. While a client-server architecture is shown, other embodiments may use a peer-to-peer architecture, where functionality of the server resides in each client device. In a preferred embodiment, system 800 is implemented in multi-tier or n-tier architecture with one or more client devices 801 residing at the client tier, one or more servers 802 in the middle or server application tier and one or more database servers 803 residing in the database tier. In the above variant of three-tier architecture the client, the first tier, may have to only perform the user interface i.e., validate inputs; in which case the middle tier holds all the backend logic and does data processing while the data server, the third tier, performs data validation and controls the database access to present content to users.

The architecture of the platform of the present invention is described below. Users interact with each other through system 800 using client devices 801. Multiple client devices 801 are connected to system server 802 via a network 814 and can be implemented on any suitable computing platform selected the user. Server 802 communicates with the client devices 801 over the network 814 to present a user interface or graphical user interface (GUI) for system 800 of the present invention. The user interface of system 800 of the present invention can be presented through a web browser or through another suitable software application communicating with server 802 and is used for displaying, entering, publishing, and/or managing data required for the service as the dashboard referred to above. As used herein, the term "network" generally refers to any collection of distinct networks working together to appear as a single network to a user. The term also refers to the so-called world wide web, network of networks or Internet which is connected to each other using the Internet protocol (IP) and other similar protocols. As described herein, the exemplary public network 814 of FIGS. 8-9 is for descriptive purposes only.

Although the description may refer to terms commonly used in describing public networks such as the Internet, the description and concepts equally apply to other public and private computer networks, including systems having architectures dissimilar to that shown in FIGS. 8-9. The inventive idea of the present invention is applicable for all existing wireless network topologies or respective communication standards, such as GSM, UMTS/HSPA, 802.11, LTE, 4G, 5G cellular networks and the like.

With respect to the present description, server 802 may include any service that relies on a database system that is accessible over a network, in which various elements of hardware and software of the database system may be shared by one or more users of the system 800.

The GUI or user interface dashboard provided by server 802 on client devices 801 through a web browser or app may be utilized for utilizing service system 800 and includes the screens shown above in which the user operates the app of the present invention.

The components appearing in system server 802 refer to an exemplary combination of those components that would need to be assembled to create the infrastructure to provide the tools and services contemplated by the present invention. As will be apparent to one skilled in the relevant art(s), all of components inside of system server 802 may be connected and may communicate via a wide or local area network (WAN or LAN).

System server 802 includes an application server or executing unit 804. The application server or executing unit 804 comprises a web server 806 and a computer server 808 that serves as the application layer of the present invention. Web server 806 is a system that sends out Web pages containing electronic data files in response to Hypertext Transfer Protocol (HTTP) requests from remote browsers (i.e. browsers installed in the client devices 801) or in response to similar requests made through a software application of the present invention installed on a client device 801. The web server 806 can communicate with the app of the present invention and/or with a web browser installed on a client device 801 to provide the user interface required for the service.

The computer server 808 may include processor 810, random-access memory (RAM) (not shown in figures) for temporary storage of information, and read-only memory (ROM) (not shown in figures) for permanent storage of information. Computer server 808 may be generally controlled and coordinated by operating system software. The operating system controls allocation of system resources and performs tasks such as processing, scheduling, memory management, networking, and I/O services, among (other) things. Thus, the operating system resides in system memory and, on being executed by CPU, coordinates the operation of the other elements of server 802.

Although the description of the computer server 808 may refer to terms commonly used in describing computer servers, the description and concepts equally apply to other processing systems, including systems having architectures dissimilar to that shown in FIGS. 8-9. FIGS. 8-9 thus are provided for sufficiently enabling the preferred embodiment and alternative embodiments of the present invention but is not the only architecture upon which the present invention may be implemented.

The database tier is the source of data where at least one database server 803 generally interfaces multiple databases 812. Those databases are frequently updated by their users and administrators most often through a combination of private and public networks 814 including the Internet. While it has been described herein that the data being stored in a single database, different separate databases can also store the various data and files of multiple users.

A software application, or "app," is a computer program that may be downloaded and installed in client device 801 using methods known in the art. Apps 830 and 831, custom built for the present invention, enable one or more persons to do various tasks related to maintaining the platform of the present invention. The activities related to the service of the present invention can also be performed using the user interface (or GUI) presented through a client device-based web browser. Hereinafter, the term "user interface" is used to refer to both app user interface and the web browser user interface of the present invention. As shown in FIGS. 8-9, app 831 can be used by drivers who are warned of overhead hazards before drivers reach them. Alternatively, app 830 is used by a different set of users, to measure and locate via GPS coordinates overhead hazards.

Examples of client device 801 may include, but not limited to, mobile devices, tablets, hand-held or laptop devices, smart phones, personal digital assistants, desktop computers, wearable devices, augmented reality glasses, virtual reality headsets, or any similar device.

As illustrated in FIGS. 8-9, client device 801 may include various electronic components known in the art for this type of device. In this embodiment, client device 801 may include device display 818, computer processor 820, user input device 822 (e.g., touch screen, keyboard, microphone, and/or other form of input device known in the art), device transceiver 824 for communication, device memory 828, app 830 operably installed in computer memory 828, local data store 834 also installed in device memory 828, and data bus 826 interconnecting the aforementioned components. For purposes of this application, the term "transceiver" is defined to include any form of transmitter and/or receiver known in the art, for cellular, WIFI, radio, and/or other form of wireless or wired communication known in the art. Obviously, these elements may vary, or may include alternatives known in the art, and such alternative embodiments should be considered within the scope of the claimed invention.

The logical sequence of operational steps performed by the present invention is as follows. In an embodiment, the present invention combines a sensor, internal module, and tracking app to warn drivers of low-clearance obstacles. The weatherproof exterior sensor is mounted on a vehicle and uses sound waves to measure the heights of potential low-clearance obstacles. Connected to the sensor is an internal module that collects those heights and adds the GPS location of the low-clearance obstacle. Obstacles that are difficult to measure such as tree branches, wires, and the like can be measured and entered manually. The module communicates wirelessly with app 830 configured to operate on smart phones. App 830 allows the operator to download that information into database 812. App 830 can measure the low clearance obstacles in desired geographic locations.

Database 812 stores the height and GPS locations until it is needed on User app 831. Each driver has app 831 on their phone. If the driver is restricted from using their cell phone while operating a vehicle, app 831 can be connected to the infotainment center in the vehicle dashboard. App 831 warns the driver, with a flag and an alarm, if they are approaching a "Low Clearance" hazard that their vehicle will hit.

A use scenario for the present invention is now described. On Monday, a vehicle equipped with the present invention approaches a low clearance bridge. App 830 then measures and downloads the exact height and GPS location of the bridge onto database 812.

On Tuesday, the driver checks the height of the truck they are driving that day. The driver enters the height of the truck into the User App (831), for example 13' 4". That day, the driver of the 13'4" truck receives an audible warning and an accurate height sign on app (831) ahead of time that a bridge on the road ahead is 13'4" or below, being too low for the 13'4" truck. The driver of the 13'4" truck then takes a different route to avoid the low bridge.

Tracking App 830 can enter heights and GPS locations manually, hazards that are difficult to measure and have been measured by a technician, for example tree branches, overhead wires and the like. These are hazards that are of particular interest to power companies.

The present invention measures locations that do not always have height signs, such as parking garages, building awnings, private entrances. These are low clearance hazards that are of particular interest to ambulances and working vans. Some vehicles have high roofs, and some can be over 10' tall with lights on top. Medicare requires that all patients be picked up within 100 feet of their home. Every height in database 812 has been measured by the system of the present invention, either by providers of the system of the present invention or by individuals or companies that have utilized the system to measure geographic locations that their vehicles have hit or could hit. In some embodiments, a non-entire portion of the locations and heights of overhead hazards in the database 812 are taken from Department of Transportation websites, local government agencies, Commercial Mapping Services such as Google Maps or specialized apps like Trucker Path, transportation management systems, utility companies, transportation planning documents, geographic information system databases, roadway signage, professional trucking associations, and the like.

Driver Feedback and Reports:

The present invention maintains a secure database that stores all of the height measurements and GPS locations of potential low clearance hazards. New information can be added at any time for locations anywhere in the world.

It should be appreciated that running the app 830 on the client device 801-1 configures the client device 801-1 into an overhead hazard tracker. In a preferred embodiment, this overhead hazard tracker is configured to determine locations and heights of new overhead hazards and to transmit the locations and heights of the new overhead hazards to the database server 803. The location of a new overhead hazard can be received as an output from an automatic geolocation service (e.g., GPS) integrated into, or in communication with, the client device 801-1. The height of the new overhead hazard can be determined based on sensor readings from a sensor (e.g., the sensor disclosed within this document and depicted in FIGS. 1-7) in communication with the client device 801-1. Preferably, this sensor is mounted on the vehicle.

Alternatively, the location of the new overhead hazard can be received when the driver manually inputs the location of the new overhead hazard into the client device 801-1. The height of the new overhead hazard can be received when the driver manually inputs the height of the new overhead hazard into client device 801-1.

The client device 801-1 or the system 800 can be configured to determine the locations and heights of new overhead hazards continuously in real-time or near real-time (e.g., while driving around, the client device 801-1 or the system 800 determines the location and height of a new overhead hazard as the driver passes below the new overhead hazard). Preferably, the locations and heights of new overhead hazards are determined throughout the entire drive. The client device 801-1 or the system 800 can automatically begin determining the locations and heights of new overhead hazards as soon as vehicle motion is detected (e.g., via accelerometers in the client device 801-1 or via a GPS).

Alternatively, the client device 801-1 or the system 800 only determines the locations and heights of new overhead hazards when prompted to do so by a driver. For example, a driver takes the same route to his jobsite every day. In response to encountering a new overhead hazard, the driver interacts with the app 830 (e.g., pressing a button or using a voice command), causing the client device 801-1 or the system 800 to determine the locations and heights of any overhead hazards for a set duration (e.g., for the next 5 seconds).

Preferably, when the client device 801-1 is in communication with the system 800 (e.g., the client device 801-1 is connected to the system 800 via the network 814), the locations and heights of new overhead hazards are transmitted, continuously in real-time, to the database server 803 as soon as the locations and heights of the new overhead hazards are determined. Alternatively, the locations and heights of new overhead hazards are transmitted, periodically (e.g., every 10 s), to the database server 803 as soon as the locations and heights of the new overhead hazards are determined. For small periods, the locations and heights of the new overhead hazards can be stored in the RAM of a client device 801-1. This RAM can be cleared after the locations and heights of the new overhead hazards are transmitted to the database server 803 to preserve memory.

When the client device 801-1 is not in communication with the system 800 (e.g., the driver is driving through a section of road for which the network 814 is inaccessible), the locations and heights of new overhead hazards are transmitted to the database server 803 as soon as the client device 801-1 is in communication with the system 800 again (e.g., the client device 801-1 is reconnected to the system 800 via the network 814). While there is no connection, the locations and heights of new overhead hazards can be stored in the RAM or long-term memory of the client device 801-1. This RAM or long-term memory can be cleared after the locations and heights of the overhead hazards are transmitted to the database server 803 to preserve memory.

When the database server 803 receives the location and height of a new overhead hazard, the database server 803 can perform a search algorithm to determine if the location and height of the new overhead hazard is already in the database 812 (e.g., whether or not the new overhead hazard is a duplicate or likely duplicate of an overhead hazard already within the database 812). If the location and height of the new overhead hazard is already in the database 812, the location and height of the new overhead hazard is not entered into the database 812. If the location and height of the new overhead hazard is not in the database 812, the location and height of the new overhead hazard is entered into the database 812. Alternatively, the database server 803 enters the locations and heights of all new overhead hazards it receives. The database server 803 can continuously or periodically perform a deduplication algorithm to remove duplicates or likely duplicates within the database 812.

In an embodiment, the database 812 is configured to store the time when the location and height of a new overhead hazard was received by the database server 803. The database server 803 can continuously or periodically perform a time-based removal algorithm to remove the locations and heights of overhead hazards that were not re-received by the database server 803 within a set timeframe. For example, the database server 803 receives the location and height of a low tree branch. No location and height corresponding to this tree branch is received for the next 90 days, indicating that low tree branch was likely cut off shortly after its location and height were first received. Conversely, the database server 803 receives the location and height of a new bridge. Locations and heights corresponding to this new bridge are received daily, indicating that the new bridge is likely a permanent feature that will not be removed soon. This process ensures that the locations and heights of permanent or semi-permanent overhead hazards stay within the database 812 while the locations and heights of temporary overhead hazards are gradually removed. It should be appreciated that the database can be configured to store the time when the location and height of the new overhead hazard was determined and the time-based removal algorithm can be based on such times.

In some embodiments, drivers who use the app 830 to populate the database 812 with the locations and heights of new overhead hazards are compensated. The amount of compensation can be based on factors such as distance covered, the number of locations and heights of new overhead hazards transmitted to the database server 803, the number of new overhead hazards identified (e.g., the new overhead hazard is not a duplicate within the database 812), etc. Compensation can be monetary compensation, a discount for using the app 831, etc.

It should be appreciated that running the app 381 on the client device 801-2 configures the client device 801-2 into a warning module. In a preferred embodiment, this warning module is configured to determine, using an automatic geolocation service, a real-time location of the client device 801-2 (generally the location of the vehicle); retrieve, from the database 812, the location and height of an overhead hazard near the location of the client device 801-2 (generally the location of the vehicle); and, when the overhead hazard is too low for the vehicle to safely pass below the overhead hazard: provide a warning to the driver before the vehicle reaches the overhead hazard.

In an embodiment, app 831 is provided through a monthly subscription that utilizes the information on the database to warn drivers with a flag that shows the hazard height, and an audible alarm that they are approaching a low clearance hazard that their vehicle will crash into.

The alarm is the key feature because there is no alarm currently on any of the commercial GPS programs and serves a driver who is watching the road and not watching the phone. The alarm signals STOP and LOOK, when there is a problem ahead. The driver can make adjustments to their route.

User App 831 also warns drivers if they are about to enter Parkways in NY, NJ, CT and Massachusetts. Commercial vehicles are not allowed on Parkways in those states.

Thus, app 831 follows the route the driver is taking and provides warnings as they travel.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

While FIG. 8 shows a general client server architecture that depicts a client device 801 with both apps 830 and 831 communicating with server 800, FIG. 9 shows app 830 running on client device 801-1 and app 831 running on a different client device 801-2, in embodiments where different types of users use one or the other of apps 830 and 831.

Figure 10:
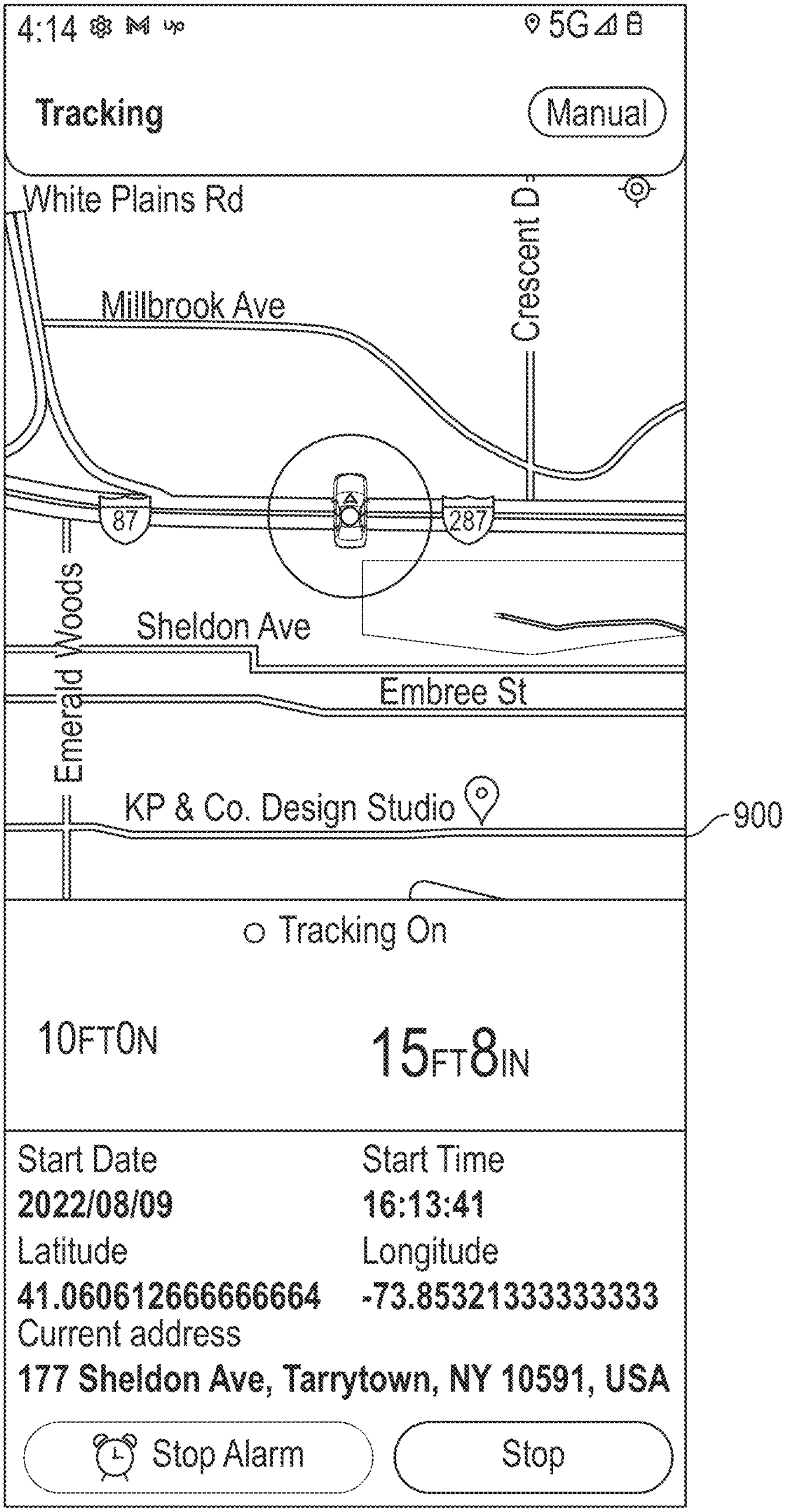
FIG. 10 depicts a user interface screen for a tracking app that displays a height of an overhead obstacle such as a highway overpass.

FIG. 10 depicts user interface screen 900 for tracking app 831 that displays a height of an overhead obstacle such as a highway overpass. As shown, interface screen 900 shows a vehicle passing under a highway overpass having a height of 15 feet 8 inches. For a truck having a height of 10 feet, 0 inches, this is safe.

Figure 11:
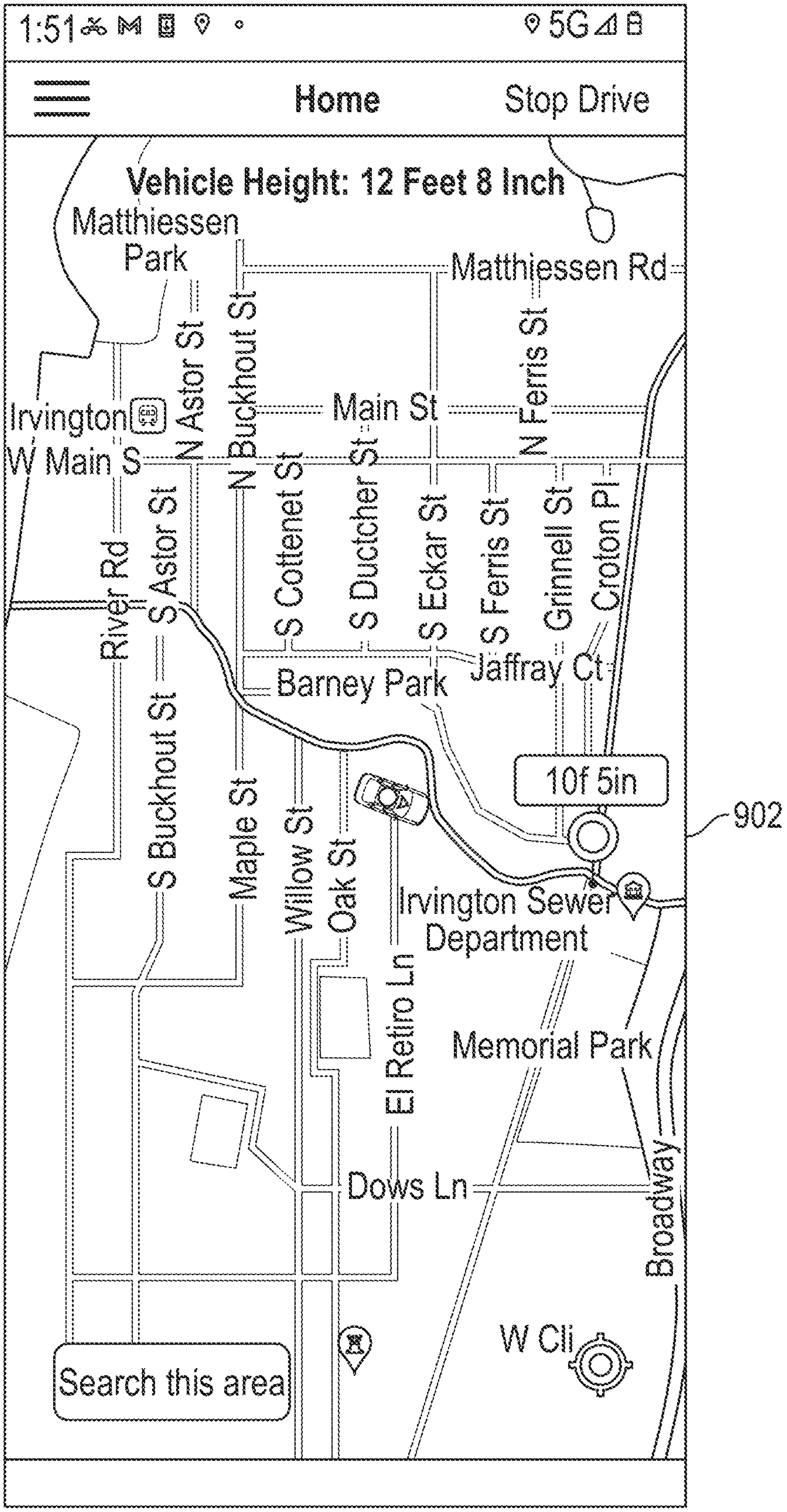
FIG. 11 depicts a user interface screen showing an overhead hazard ahead of a vehicle on a local map.

FIG. 11 depicts user interface screen 902 for tracking app 831 showing an overhead hazard ahead of a vehicle on a local map. As the vehicle height shown on interface screen 902 has a height of 12 feet 8 inches, the driver is about to receive a warning.

Figure 12:
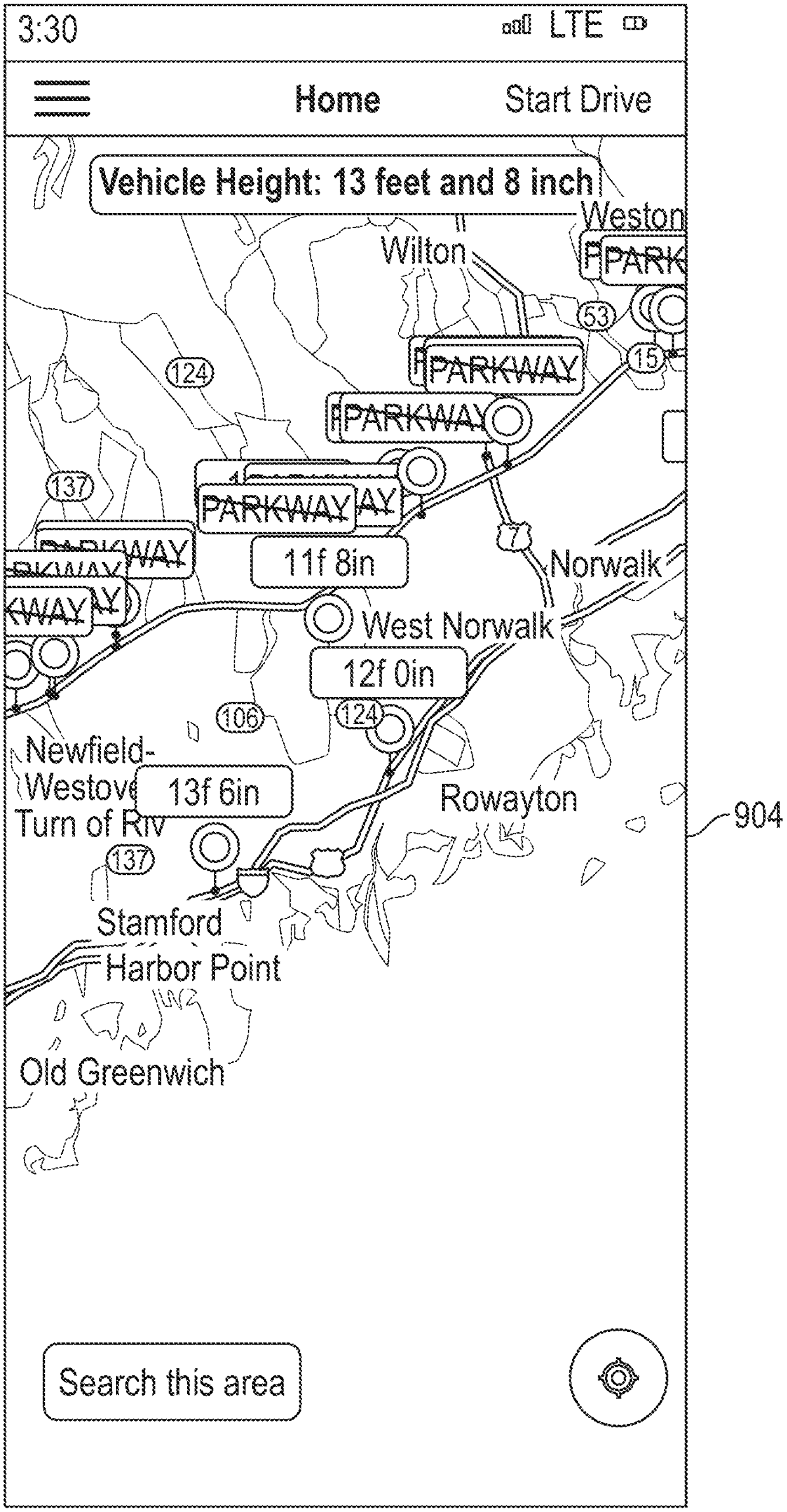
FIG. 12 depicts a user interface screen showing multiple hazards and parkways on a map.

FIG. 12 depicts user interface screen 904 showing multiple hazards and parkways on a map. Parkways are shown in red, as trucks are not allowed on parkways in this area. Overhead hazards are identified wherever their height is lower than the vehicle driven by the user of app 831, which on interface screen 904 is 13 feet 8 inches.

Figure 13:
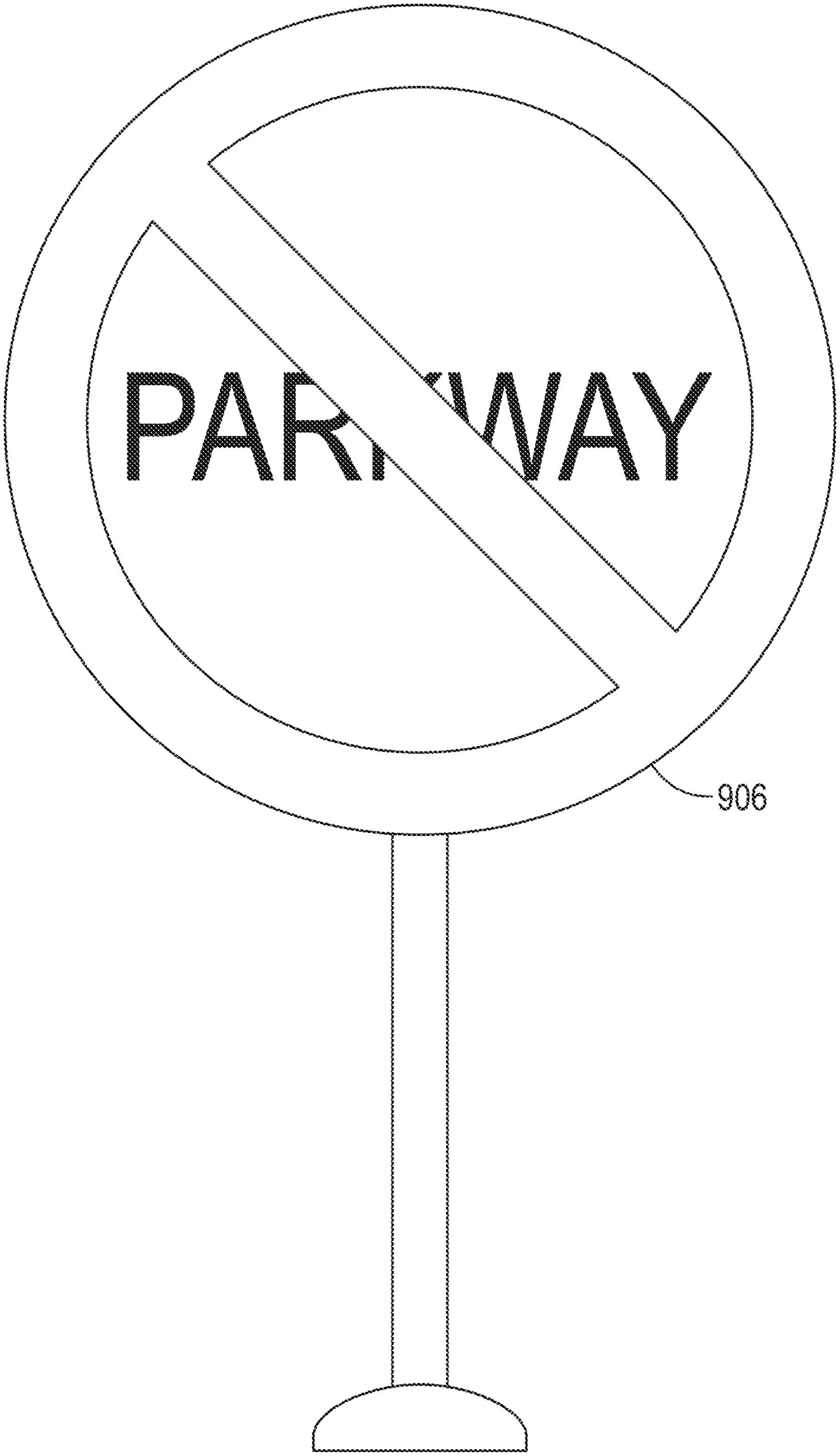
FIG. 13 depicts a user interface screen showing a warning not to travel on a parkway encountered by a truck driver.

FIG. 13 depicts user interface screen 906 showing a warning not to travel on a parkway encountered by a truck driver. If a truck using app 831 enters a parkway, interface screen 906 is displayed to the driver and an audible alarm is sounded.

Figure 14:
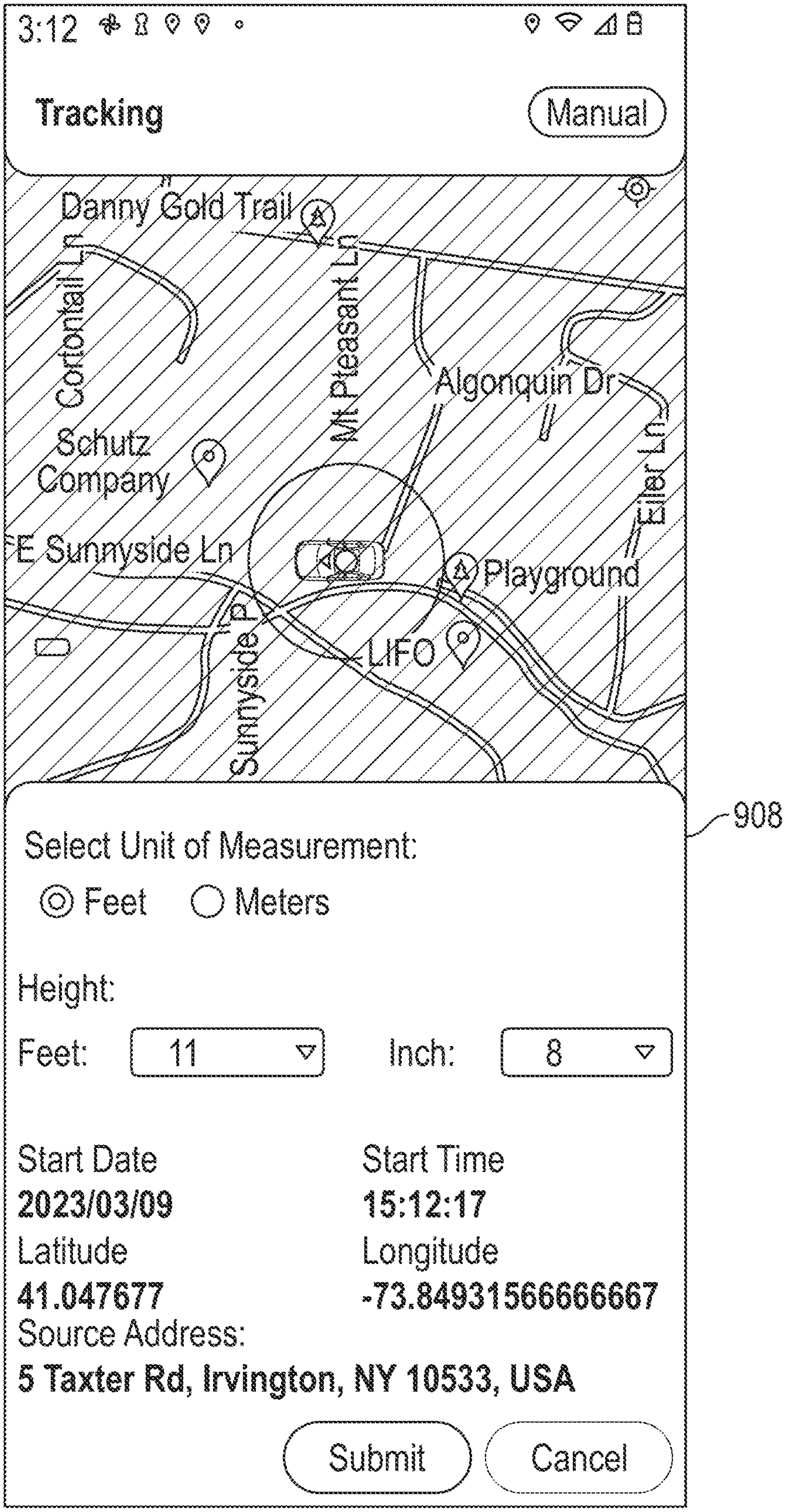
FIG. 14 depicts a user interface screen for entering measurement data and GPS location data for an overhead obstacle to be stored in a database.

FIG. 14 depicts user interface screen 908 for entering measurement data and GPS location data for an overhead obstacle to be stored in a database. Interface screen 908 is used by app 830 for populating a database of overhead obstacles for use by app 831.

While this document discloses using a GPS as the preferred way to determine locations, it should be appreciated that locations can be determined using any automatic geolocation service. For example, GPS, GLONASS, Galileo, BeiDou, Wi-Fi positioning systems, cellular network positioning systems, Bluetooth beacons, visual positioning systems, or any combination thereof can be used to accurately determine the location of a vehicle or overhead hazard.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms “substantially” and “about” if used in this specification, are used to describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed inventive subject matter. Various functions and elements described herein may be partitioned differently from those shown without departing from the scope of the disclosed inventive subject matter. Generic principles defined herein may be applied to other implementations. Different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail herein (provided such concepts are not mutually inconsistent) are contemplated as being part of the disclosed inventive subject matter. In particular, all combinations of claimed subject matter appearing at the end of this disclosure are contemplated as being part of the inventive subject matter disclosed herein. While the disclosed inventive subject matter has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed inventive subject matter in its broader aspects is not limited to any of the specific details, representative devices and methods, and/or illustrative examples shown and described. Accordingly, departures may be made from such details without departing from the spirit or scope of the general inventive concept. It should be appreciated that all method steps described in this application can be performed automatically and in real-time.

We claim:

1. A method of warning a driver of a vehicle of an overhead hazard, the method comprising steps of:
- providing a database storing locations and heights of overhead hazards;
- determining, using an automatic geolocation service associated with a first driver of a first vehicle, a real-time location of the first vehicle, the first vehicle having a known height;
- transmitting, from the database to a warning module associated with the first driver of the first vehicle, a location and height of an overhead hazard near the location of the first vehicle;
- when the overhead hazard is too low for the first vehicle to safely pass below the overhead hazard:
  - causing the warning module to warn the first driver before the first vehicle reaches the overhead hazard;
- transmitting, from an overhead hazard tracker associated with a second driver of a second vehicle to the database, a location and height of a new overhead hazard; and
- updating the database to include the location and height of the new overhead hazard.

2. The method of claim 1, further comprising steps of:
- receiving the known height of the first vehicle from the first driver.

3. The method of claim 1, wherein
- the height of the new overhead hazard is determined using sensor readings from a sensor mounted on the second vehicle.

4. The method of claim 1, wherein
- the height of the new overhead hazard is determined using sensor readings from a sensor mounted on the second vehicle; and
- the location of the new overhead hazard is determined using an automatic geolocation service associated with the second driver of the second vehicle.

5. The method of claim 4, wherein
- when the overhead hazard tracker is in communication with the database:
  - the height and location of the new overhead hazard is continuously or periodically transmitted from the overhead hazard tracker to the database.

6. The method of claim 4, wherein
- when the overhead hazard tracker is in not communication with the database:
  - the location and the height of the new overhead hazard is stored in memory of the overhead hazard tracker;
- when the overhead hazard tracker is in communication with the database:
  - the height and location of the new overhead hazard is automatically or manually transmitted from the overhead hazard tracker to the database.

7. The method of claim 1, wherein
- the height of the new overhead hazard is received when the second driver inputs the height of the new overhead hazard into the overhead hazard tracker;
- the location of the new overhead hazard is received when the second driver inputs the location of the new overhead hazard into the overhead hazard tracker.

8. The method of claim 7, wherein
- when the overhead hazard tracker is in communication with the database:
  - the height and location of the new overhead hazard is continuously or periodically transmitted from the overhead hazard tracker to the database.

9. The method of claim 7, wherein
- when the overhead hazard tracker is in not communication with the database:
  - the location and the height of the new overhead hazard is stored in memory of the overhead hazard tracker;
- when the overhead hazard tracker is in communication with the database:
  - the height and location of the new overhead hazard is automatically or manually transmitted from the overhead hazard tracker to the database.

10. The method of claim 1, wherein
- the database is updated in real-time when the location and height of the new overhead hazard is transmitted from the overhead hazard tracker to the database.

11. A system to warn a driver of a vehicle of an overhead hazard, the system comprising:

a database storing locations and heights of overhead hazards;

a warning module associated with the first driver of the first vehicle, the warning module configured to:

determine, using an automatic geolocation service, a real-time location of the first vehicle, the first vehicle having a known height;

receive, from the database, a location and height of an overhead hazard near the location of the first vehicle;

when the overhead hazard is too low for the first vehicle to safely pass below the overhead hazard:

provide a warning to the first driver before the first vehicle reaches the overhead hazard;

an overhead hazard tracker associated with a second driver of a second vehicle, the overhead hazard tracker configured to:

determine a location and height of the new overhead hazard;

transmit the location and height of the new overhead hazard to the database;

wherein the database is updated periodically or continuously to include the location and height of the new overhead hazard.

12. The system of claim 11, wherein the known height of the first vehicle is received from the first driver.

13. The system of claim 11, wherein the height of the new overhead hazard is determined using sensor readings from a sensor mounted on the second vehicle.

14. The system of claim 11, wherein the height of the new overhead hazard is determined using sensor readings from a sensor mounted on the second vehicle; and the location of the new overhead hazard is determined using an automatic geolocation service associated with the second driver of the second vehicle.

15. The system of claim 14, wherein when the overhead hazard tracker is in communication with the database:

the height and location of the new overhead hazard is continuously or periodically transmitted from the overhead hazard tracker to the database.

16. The system of claim 14, wherein when the overhead hazard tracker is in not communication with the database:

the location and the height of the new overhead hazard is stored in memory of the overhead hazard tracker;

when the overhead hazard tracker is in communication with the database:

the height and location of the new overhead hazard is automatically or manually transmitted from the overhead hazard tracker to the database.

17. The system of claim 11, wherein the height of the new overhead hazard is received when the second driver inputs the height of the new overhead hazard into the overhead hazard tracker;

the location of the new overhead hazard is received when the second driver inputs the location of the new overhead hazard into the overhead hazard tracker.

18. The system of claim 17, wherein when the overhead hazard tracker is in communication with the database:

the height and location of the new overhead hazard is continuously or periodically transmitted from the overhead hazard tracker to the database.

19. The system of claim 17, wherein when the overhead hazard tracker is in not communication with the database:

the location and the height of the new overhead hazard is stored in memory of the overhead hazard tracker;

when the overhead hazard tracker is in communication with the database:

the height and location of the new overhead hazard is automatically or manually transmitted from the overhead hazard tracker to the database.

20. The system of claim 11, wherein the database is updated in real-time when the location and height of the new overhead hazard is transmitted from the overhead hazard tracker to the database.

* * * * *